(12) United States Patent
Benkreira et al.

(10) Patent No.: US 10,783,878 B2
(45) Date of Patent: *Sep. 22, 2020

(54) ANALYSIS OF A TOPIC IN A COMMUNICATION RELATIVE TO A CHARACTERISTIC OF THE COMMUNICATION

(71) Applicant: Capital One Services, LLC, McLean, VA (US)

(72) Inventors: Abdelkadar M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,714

(22) Filed: Dec. 12, 2019

(65) Prior Publication Data
US 2020/0251102 A1 Aug. 6, 2020

Related U.S. Application Data

(63) Continuation of application No. 16/454,428, filed on Jun. 27, 2019, now Pat. No. 10,515,630, which is a (Continued)

(51) Int. Cl.
*G10L 15/18* (2013.01)
*G10L 15/06* (2013.01)
(Continued)

(52) U.S. Cl.
CPC ........ *G10L 15/1822* (2013.01); *G06K 9/6263* (2013.01); *G06N 20/00* (2019.01);
(Continued)

(58) Field of Classification Search
CPC ....... G10L 15/16; G10L 15/04; G10L 15/063; G10L 15/22; G10L 15/1822; G10L 15/1815; G06N 20/00; G06K 9/6263
See application file for complete search history.

(56) References Cited

U.S. PATENT DOCUMENTS 9,418,375 B1 8/2016 Cunico et al.
10,395,648 B1 8/2019 Benkreira et al.
(Continued)

*Primary Examiner* — Mohammad K Islam
(74) *Attorney, Agent, or Firm* — Harrity & Harrity, LLP

(57) ABSTRACT

A device monitors a communication between a user associated with a user device and a service representative associated with a service representative device, and causes a natural language processing model to perform a natural language processing analysis of a user input of the communication to identify a topic associated with the communication. The device determines a first score associated with the topic, and determines a second score associated with enabling the communication, where the first score and second score indicate a service performance score of an entity. The device causes a sentiment analysis model to perform a sentiment analysis of the communication to determine a sentiment score indicating a level of satisfaction the user has relative to the topic. The device updates a transaction protocol associated with the topic based on the service performance score, and/or updates a communication processing protocol associated with the communication based on the sentiment score.

20 Claims, 9 Drawing Sheets

Related U.S. Application Data continuation of application No. 16/269,373, filed on Feb. 6, 2019, now Pat. No. 10,395,648.

(51) Int. Cl.
    *G06K 9/62*    (2006.01)
    *G06N 20/00*    (2019.01)

(52) U.S. Cl.
    CPC ........ *G10L 15/063* (2013.01); *G10L 15/1815* (2013.01); *G10L 2015/0635* (2013.01)

(56) References Cited

U.S. PATENT DOCUMENTS

| | | |
|---|---|---|
| 10,515,630 B1 | 12/2019 | Benkreira et al. |
| 2008/0249764 A1 | 10/2008 | Huang et al. |
| 2010/0332287 A1 | 12/2010 | Gates et al. |
| 2015/0046371 A1* | 2/2015 | Leary ................ G06Q 30/0282 705/347 |
| 2015/0195406 A1* | 7/2015 | Dwyer ................ H04M 3/5175 379/265.07 |
| 2016/0070551 A1* | 3/2016 | Miller .................. G06F 16/958 717/148 |
| 2016/0198509 A1* | 7/2016 | Hayes, Jr. ............ H04W 8/005 370/329 |
| 2016/0352900 A1* | 12/2016 | Bell ..................... H04M 3/5175 |
| 2016/0360466 A1* | 12/2016 | Barak ..................... H04W 8/26 |
| 2017/0111507 A1* | 4/2017 | McGann ............. H04M 3/5232 |
| 2017/0169815 A1* | 6/2017 | Zhan ....................... G10L 15/14 |
| 2018/0011977 A1* | 1/2018 | Takeda .................. G16H 50/20 |
| 2018/0025360 A1* | 1/2018 | Gorny .................... G06Q 30/01 707/748 |
| 2018/0049023 A1* | 2/2018 | Stuber ..................... G06F 9/452 |
| 2018/0246801 A1* | 8/2018 | Krauss ............. G06F 16/11361 717/124 |
| 2018/0308487 A1* | 10/2018 | Goel ..................... G10L 15/1815 |
| 2018/0322403 A1* | 11/2018 | Ron ....................... G06Q 10/107 |
| 2019/0037072 A1* | 1/2019 | Engelke ................. G10L 15/265 |
| 2019/0057310 A1* | 2/2019 | Olmstead ............ G06N 3/0427 |
| 2019/0089631 A1* | 3/2019 | Rijsman ................. H04L 45/02 |

* cited by examiner

700 →

710 — Receive a user input from a user, wherein the user input is included in a communication between a user device associated with the user and a service representative device associated with a service representative of an entity 720 — Perform a natural language processing analysis of the user input, wherein the natural language processing analysis is configured to identify one or more specific topics 730 — Identify, from the natural language processing analysis of the user input, a topic associated with the communication, wherein the topic is one of the one or more specific topics 740 — Determine a first score associated with the topic, wherein the first score indicates a value associated with the topic 750 — Perform, based on the natural language processing analysis, a sentiment analysis of the communication 760 — Determine, based on the sentiment analysis, a sentiment score associated with the topic, wherein the sentiment score indicates a level of satisfaction of the user with respect to the topic 770 — Determine a second score associated with the communication, wherein the second score indicates a value associated with enabling the communication 780 — Update a machine-learning model to update one or more of the following: a communication processing protocol associated with the communication, or a transaction protocol implemented by the entity, wherein the transaction protocol is related to a transaction associated with the topic of the communication

FIG. 7

ANALYSIS OF A TOPIC IN A COMMUNICATION RELATIVE TO A CHARACTERISTIC OF THE COMMUNICATION

RELATED APPLICATIONS

This application is a continuation of U.S. patent application Ser. No. 16/454,428, filed Jun. 27, 2019 (now U.S. Pat. No. 10,515,630), which is a continuation of U.S. patent application Ser. No. 16/269,373, filed Feb. 6, 2019 (now U.S. Pat. No. 10,395,648), the contents of which are incorporated herein by reference.

BACKGROUND

A customer service center (e.g., a call center, chat interface and/or the like) is equipped to handle customer communications such as telephone communications, e-mail, messages, and/or live chat communications. The customer service center may route such communications to appropriate employees (e.g., service representatives) and/or platforms associated with an entity in order to receive and/or respond to customer feedback regarding services provided by the entity, transactions involving the entity, and/or the like.

SUMMARY

According to some implementations, a method may include receiving, by a device, a user input, wherein the user input is received via a communication between a user device and a service representative device, and wherein the service representative device is associated with an entity. The method may include identifying, by the device and using a machine learning model, a communication processing protocol of a plurality of communication processing protocols based on one or more of the user input, the user device, the service representative device, the communication, the entity, or historical communication information, and assigning, by the device, the communication to the service representative device based on the communication processing protocol. The method may include analyzing, by the device, the user input, wherein the user input is analyzed to identify a topic associated with the communication, and determining, by the device and based on the topic, a first score associated with the topic, wherein the first score indicates a value associated with the topic. The method may include causing, by the device and based on the communication, a sentiment analysis model to analyze a sentiment of the user in relation to the topic, wherein the sentiment is associated with a user satisfaction level associated with the topic, wherein the sentiment analysis model determines one or more second scores based on the communication and based on the user satisfaction level associated with the topic, and wherein the one or more second scores indicate a value associated with enabling the communication. The method may include comparing, by the device, the first score and the one or more second scores to generate model feedback, and updating, by the device and based on the generated model feedback, the machine learning model to update one or more of: the communication processing protocol of the plurality of communication processing protocols, or a transaction protocol of a plurality of transaction protocols implemented by the entity, wherein the transaction protocol is related to a transaction associated with the topic of the communication.

According to some implementations, a device may include one or more memories, and one or more processors, communicatively coupled to the one or more memories, to receive a user input from a user, wherein the user input is included in a communication between a user device associated with the user and a service representative device associated with a service representative of an entity. The one or more processors may perform a natural language processing analysis of the user input, wherein the natural language processing analysis is configured to identify one or more specific topics. The one or more processors may identify, from the natural language processing analysis of the user input, a topic associated with the communication, wherein the topic is one of the one or more specific topics, and determine a first score associated with the topic, wherein the first score indicates a value associated with the topic. The one or more processors may perform, based on the natural language processing analysis, a sentiment analysis of the communication, and determine, based on the sentiment analysis, a sentiment score associated with the topic, wherein the sentiment score indicates a level of satisfaction of the user with respect to the topic. The one or more processors may determine a second score associated with the communication, wherein the second score indicates a value associated with enabling the communication, and update, based on the generated model feedback, a machine learning model to update one or more of the following: a communication processing protocol associated with the communication, or a transaction protocol implemented by the entity, wherein the transaction protocol is related to a transaction associated with the topic of the communication.

According to some implementations, a non-transitory computer-readable medium may store instructions that include one or more instructions that, when executed by one or more processors of a device, cause the one or more processors to monitor a communication between a user and a service representative, wherein the user is associated with a user device and the service representative is associated with a service representative device. The one or more instructions may cause the one or more processors to cause a natural language processing model to perform a natural language processing analysis of a user input of the communication, and identify, from the natural language processing analysis of the user input, a topic associated with the communication. The one or more instructions may cause the one or more processors to determine a first score associated with the topic, and determine a second score associated with enabling the communication, wherein the first score and the second score indicate a service performance score of an entity. The one or more instructions may cause the one or more processors to cause a sentiment analysis model to perform a sentiment analysis of the communication, wherein the sentiment analysis model is configured to perform the sentiment analysis to determine a sentiment score associated with the topic, and wherein the sentiment score indicates a level of satisfaction that the user has relative to the topic. The one or more instructions may cause the one or more processors to update at least one of: a transaction protocol associated with the topic based on the service performance score, or a communication processing protocol associated with the communication based on the sentiment score.

BRIEF DESCRIPTION OF THE DRAWINGS

FIGS. 6-8 are flowcharts of one or more example processes associated with an analysis of a topic in a communication relative to a characteristic of the communication.

DETAILED DESCRIPTION

Figure 1:
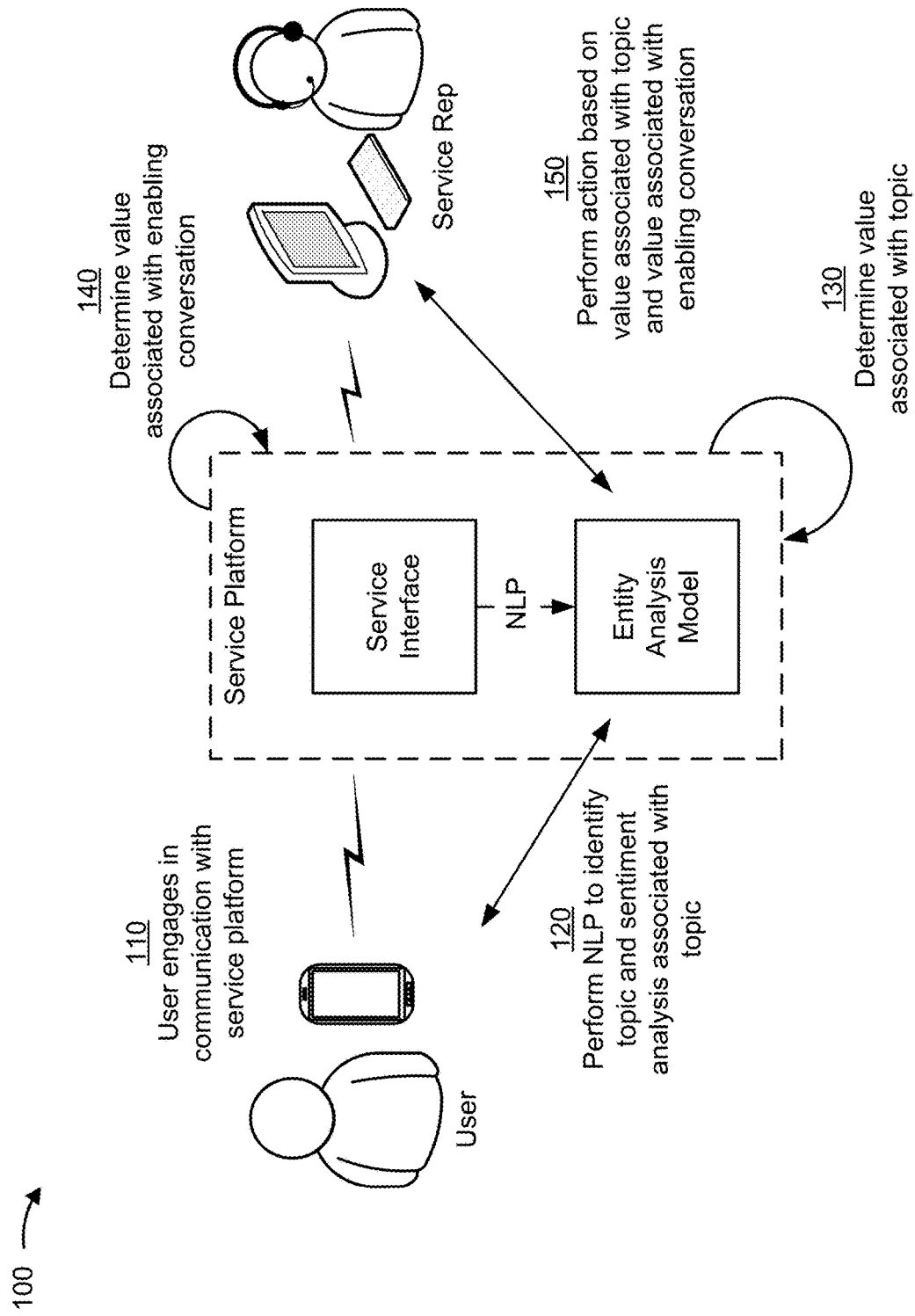
FIGS. 1, 2, 3A, and 3B are diagrams of one or more example implementations described herein.

The following detailed description of example implementations refers to the accompanying drawings. The same reference numbers in different drawings may identify the same or similar elements.

In many instances, an entity (e.g., an individual, an organization, and/or the like) may utilize a customer service center to receive feedback, from customers, regarding a service that is provided by the entity and/or a transaction associated with the entity. The customer service centers may include a platform and/or a plurality of service representative devices (e.g., user devices, such as computers, telephones, and/or the like). The platform may route communications (e.g., phone calls, messages, and/or the like) from user devices of the customers to the service representative devices.

In many instances, utilization of the customer service center may be tracked, managed, and/or maintained via a plurality of computing platforms and/or devices. For example, each of the service representative devices may store and/or manage information associated with communications involving the service representative devices. Such information may include or identify topics of the communications, identification information of the customers, feedback information from the customers, and so on. In some instances, each service representative device may individually receive, store, and/or maintain the information associated with the communications. Furthermore, the information may be analyzed in a batched processing manner, which involves sending relatively large amounts of information in batches (e.g., every day, every week, every month, etc.), from each of the service representative devices to a central location for sorting and further analysis. Accordingly, the customer service centers may consume and/or waste a plurality of computing resources (e.g. processing resources and/or memory resources) associated with communicating, processing, and/or storing the information. Furthermore, such customer service centers may waste a plurality of financial resources associated with managing the information, especially if a financial cost of receiving the information, storing the information, analyzing the information, etc., exceeds the benefits received from the services provided.

According to some implementations, an example service platform may analyze a communication involving a service representative device, determine a topic associated with the communication (e.g., a service, a transaction, and/or the like associated with the entity), determine one or more characteristics of the topic, determine the sentiment associated with the topic from a user input (e.g., a user input from a customer) of the communication, and update a transaction protocol associated with the topic and/or a communication processing protocol associated with the communication based on the sentiment. In some implementations, the service platform may correspondingly perform the above process on a plurality of communications. Such processes may correspondingly be performed in real-time, during the communications. In some implementations, one or more machine learning models may be configured to analyze the topic and/or a characteristic of the service platform to determine whether the transaction protocol and/or the communication processing protocol are to be updated. In this way, the service platform may update the transaction protocol and/or the communication processing protocol according to a sentiment of one or more users (e.g., customers).

In some implementations, the update to the transaction protocol may include suspending and/or discontinuing a service and/or transaction associated with the topic. For example, the service platform may suspend or discontinue the service and/or the transaction to prevent the service platform from having to spend additional or further computing resources and/or network resources on communications involving the topics.

Additionally, or alternatively, the update to the communication processing protocol may involve rerouting the communication to another service representative according to the sentiment and/or the topic. For example, the other service representative, according to one or more machine learning models described herein, may be determined to be better suited to handle the communication. Furthermore, the one or more machine learning models may be configured to generate and/or score service representatives according to the sentiment of the user during the communication to identify the most qualified service representatives (e.g., or profiles associated with the service representatives). In this way, updating the communication processing protocol to route the communication between the user device and a service representative device of a most qualified service representative can conserve computing resources and/or network resources of the service platform as the most qualified service representative can more quickly and efficiently handle the communication relative to other service representatives.

As described herein, the service platform may use one or more artificial intelligence techniques, such as machine learning, deep learning, and/or the like to analyze a topic of a communication based on a characteristic of the communication. For example, the service platform may analyze a topic of a communication based on enabling the communication. In some implementations, the service platform may analyze and/or compare a value associated with the topic relative to a value associated with enabling a communication involving the topic. Additionally, or alternatively, the service platform may analyze a sentiment associated with the topic relative to a communication processing protocol associated with the communication.

FIG. 1 is a diagram of an example implementation 100 described herein. Example implementation 100 includes a user device, a service representative device, and a service platform. The service platform, of example implementation 100, includes a service interface and an entity analysis model that is configured to analyze a topic and/or a communication between the user device and the service representative device, which may include a conversation between a user and a service representative (shown as a "Service Rep"). In this way, as described herein, the service platform may perform one or more actions involving a transaction protocol associated with the topic and/or a communication processing protocol associated with the communication. As described herein, the service representative device and/or the service platform may be associated with an entity, such as an entity that provides a service to the user of example implementation 100.

As shown in FIG. 1, and by reference number 110, the user engages in a communication with the service platform (e.g., to speak with a service representative). In some implementations, the user may engage in the communication via the user device and/or some other device (e.g., another user device, a telephone, such as a landline telephone, an online portal, and/or the like). As described herein, the communication may include the user and/or service representative speaking through a phone call, sending instant messages, sending email messages, sending text messages, and/or the like. Accordingly, the communication may be performed via a communication interface of the user device, such as a telephone interface, a chat interface (e.g., used to exchange (send and/or receive) the instant messages), and/or the like. Therefore, the communication may involve realtime communication between the user and the service platform and/or between the user and the service representative.

In some implementations, the user initiates the communication with the service platform. For example, the user may contact (e.g., via a phone call, a chat interface, and/or the like) the service platform and/or service representative to discuss a matter associated with an account (e.g., an account associated with the user that is registered with the entity). More specifically, the user may contact the service platform and/or service representative to provide feedback associated with a service and/or transaction, discuss a billing matter, engage in a transaction (e.g., to purchase a product, to pay for a service, and/or the like), apply to engage in a transaction (e.g., apply for a loan, apply to lease a product, and/or the like), and/or the like. In some implementations, the service platform and/or the service representative may initiate the communication with the user. For example, the service platform and/or service representative may contact the user to verify information associated with the account, to verify a transaction involving the account, to provide information associated with the account, to request payment associated with the account, and/or the like.

As described herein, the account is associated with the entity in that the account may be a registered account of the entity that is used (e.g., by an authorized user) to interact with the entity. For example, through use of the account, the user may provide information to the entity and/or perform one or more actions involving the entity, such as make a payment to the entity or engage in a transaction with the entity, request a service from the entity, provide feedback to the entity, and/or the like. In some implementations, the service platform may include and/or be associated with an authentication platform that performs an authentication process to verify that the user is associated with the account (e.g., in order to prevent fraudulent access to the account by an unauthorized user). Accordingly, if the user is determined, by the authentication platform, to be an authorized user of the account, the account may be considered an account of the user, and the service platform may permit the communication between the user and the service representative to continue. Otherwise, if the authentication platform determines that the user is not an authorized user, the authentication platform may suspend and/or end the communication.

In some implementations, the service platform may perform one or more operations to identify the user (e.g., when the user initiates the communication). For example, the service platform may use a caller identification (ID) process to identify the user (e.g., by matching a phone number to a phone number associated with the account). Additionally, or alternatively, the service platform may prompt the user (e.g., via an automated response system and/or an automated information gathering system of a chat interface, and/or the like) to provide identification information associated with the user (e.g., a name, an identification number, an account number, and/or the like) via the communication interface (e.g., a microphone, touchscreen interface, keypad, or the like). In such cases, the user may be able to speak and/or provide the identification information via a user interface of the user device. Additionally, or alternatively, the service platform may identify the user based on the communication being initiated from an account associated with the entity. For example, the user may open a chat interface after the user logs in to a webpage or application that hosts the chat interface. In such cases, identification information associated with the account from which the user accessed the chat interface may be used to identify the user. Accordingly, the service platform may obtain identification information associated with the user and/or identification information associated with the account, and provide such identification information to the authentication platform to permit authentication of the user as described herein.

In some implementations, the service platform may detect the communication between the user and the service representative. For example, the service platform may detect that the service interface has opened a communication between the user device and/or the service representative. In some implementations, the service platform may identify a communication processing protocol, from a plurality of communication processing protocols. For example, the communication processing protocol may be identified based on the user device, the service representative device, the communication, the entity, and/or historical communication information associated with previous communications involving the service platform.

In some implementations, the service platform may use a machine learning model, such as a communication processing protocol identification model, to identify the communication processing protocol of the communication. For example, the service platform may train the communication processing protocol identification model based on one or more parameters associated with identifying the communication processing protocol, such as one or more characteristics of the user device (e.g., a type of the user device, an identifier associated with the user device, a user associated with the user device, an account associated with the user device, a location of the user device, and/or the like), one or more characteristics of the service representative device (e.g., a type of the service representative device, an identifier associated with the service representative device, a service representative associated with the service representative device, a location of the service representative device, and/or the like), the communication (e.g., a type of the communication (e.g., voice call, text message communication, instant message communication, email communication, and/or the like), a topic of the communication, a user input received via the communication, and/or the like), one or more characteristics of the entity, and/or the like. The service platform may train the communication processing protocol identification model, according to the one or more parameters, using historical data associated with one or more previous communications involving the service platform, the user device, the service representative device, the entity, and/or the like. Using the historical data and the one or more parameters as inputs to the communication processing protocol identification model, the service platform may identify the communication processing protocol, to permit the communication to be established between the user device and/or the service representative device.

Accordingly, the user may engage in a communication with the service platform and/or the service representative to permit the service platform to receive a user input via the communication and determine a topic of the communication based on an analysis of the user input.

As further shown in FIG. 1, and by reference number 120, the service platform, via the service interface and/or entity analysis model, may perform a natural language processing (shown as "NLP") of the communication and a sentiment analysis associated with the topic. For example, the service platform may monitor the communication, receive input data (e.g., a user input, such as voice data and/or text data) from the user via the user device and/or input data from the service representative via the service representative device. In some implementations, the service platform may analyze one or more characteristics of the communication.

In some implementations, the service platform may request and/or prompt the user to indicate a topic, a category, and/or a purpose for the communication. For example, the service platform may provide options for the user to select from, such as a set of topics (e.g., a set of services or transactions associated with the user and/or entity), a set of categories (e.g., whether fee related, service related, transaction related, and/or the like), a set of purposes (e.g., to pay a bill, to dispute a bill, to provide feedback, to request a service, to engage in a transaction, to apply for a loan, to order a service and/or good, and/or the like), and/or the like. As described herein, the service platform may use a natural language processing analysis of speech and/or text from the user received via the communication interface, from an automated response system that prompts the user to provide the topic and/or purpose of the call through a user input, from an automated information gathering system that prompts the user to select a purpose of the communication, and/or the like. Accordingly, the service platform may be configured to receive feedback associated with the entity from the user using the automated response system, the automated information gathering system, and/or the like.

In some implementations, the service platform may parse natural language descriptions of topics, categories of the topics, purposes for the communication, and/or the like. For example, the service platform may obtain data identifying, in natural language, a description (e.g., within a user input from the user and/or service representative) of topics, categories of the topics, purposes for the communication, and/or the like and may parse the data to identify the topic, the category, the purpose, and/or the like.

In some implementations, the service platform may determine a characteristic of a topic based on natural language processing of a user input, which may include a description of the topic. For example, based on a description of a topic being "a transaction fee was charged on my credit card," the service platform may use natural language processing to determine that the topic is a transaction fee and that the transaction fee was charged on a user's credit card. Similarly, based on a description of the topic describing "the transaction fee that I paid for my credit card is too expensive," the service platform may use natural language processing to determine characteristics of the transaction fee, such as the transaction fee was paid by the user, the transaction fee is associated with the user's credit card, the user feels the transaction fee is too expensive, and/or the like. In this case, the service platform may determine that a natural language user input corresponds to a characteristic based on data relating to the topic or other related topics, data identifying characteristics of the topic or other related topics, and/or the like.

In this way, the service platform may identify characteristics associated with topics, as described herein. Based on applying a rigorous process associated with analyzing communications and/or user inputs of the communications, the service platform enables recognition and/or identification of hundreds, thousands, or more descriptions of hundreds, thousands, or more topics, thereby enabling accurate and consistent identification of topics and/or characteristics of the topics to permit the service platform to analyze the topics relative to one or more characteristics of the communication. For example, the service platform may analyze a gain value for an entity that is associated with the topic relative to a cost value that is associated with enabling the communication.

In some implementations, the service platform may determine whether a topic is to be or can be analyzed relative to a characteristic of a communication, as described herein. For example, using one or more characteristics of the topic (e.g., a category of the topic (e.g., whether the topic is associated with a value), a sentiment associated with the topic, a user associated with the topic, a number of users associated with the topic, and/or the like), the service platform may determine whether a characteristic of the topic can be compared to a characteristic of the communication. In this way, the service platform may generate, maintain, and/or utilize the entity analysis model to determine whether the entity should continue to engage in a transaction, offer a service, and/or handle communications (and if so, how to handle the communications) associated with the topic. For example, the service platform may train the entity analysis model using information that includes a plurality of topics, a plurality of information associated with each of the topics (e.g., a gain value for the topic, a number of users associated with the topic, a number of communications involving the topic, and/or the like), a plurality of communications (e.g., maintained in a log or database), a plurality of characteristics of the communications (e.g., topics, categories of the topics, purposes, and/or the like), and/or the like, to permit the service platform to analyze the topic relative to one or more characteristics of the communication. In this way, the entity analysis model can be trained and/or utilized to ensure that an entity is receiving a benefit associated with a topic relative to enabling communications to discuss the topic.

In some implementations, when identifying a topic and/or characteristic of a topic of a communication, the service platform may use a scoring system to identify a particular topic in a user input of the communication. For example, the service platform may determine that a relatively high score (e.g., as being likely to be identified) is to be assigned to words or phrases representative of topics in a user input that are determined to be the same as, similar to, and/or representative of previously identified topics of communications (or more frequently identified than previously identified topics). In contrast, the service platform may determine that a relatively low score (e.g., as being unlikely to be identified) is to be assigned to words or phrases representative of topics in a user input that are determined to be different than previously identified topics of communications (or less frequently identified than previously identified topics).

In some implementations, the service platform may perform a data preprocessing operation when generating the entity analysis model. For example, the service platform may preprocess user inputs (e.g., speech and/or text) to remove non-ASCII characters, white spaces, confidential data (e.g., personal information, account information, and/or the like), and/or the like. In this way, the service platform may organize thousands, millions, or billions of user inputs from communications associated with the service platform for machine learning and/or model generation.

In some implementations, the service platform may perform a training operation when generating the entity analysis model. For example, the service platform may portion user inputs and/or communications into a training set, a validation set, a test set, and/or the like. In some implementations, the service platform may preprocess and/or perform dimensionality reduction to reduce the user inputs and/or communications to a minimum feature set. In some implementations, the service platform may train the entity analysis model on this minimum feature set, thereby reducing processing resources needed to train the entity analysis model, and may apply a classification technique to the minimum feature set. In this way, the entity analysis model may be trained and/or configured to identify one or more specific topics based on historical information associated with identifying the one or more specific topics and/or parameters associated with the one or more specific topics.

In some implementations, the service platform may use a classification technique, such as a logistic regression classification technique, a random forest classification technique, a gradient boosting machine learning (GBM) technique, and/or the like, to determine a categorical outcome (e.g., that determines whether a topic is beneficial to the entity based on the number of communications, that determine that the topic is not beneficial to the entity based on the number of communications, that determine a quality of customer service provided to the user by the service representative, that determine a rating of the service representative, and/or the like). Additionally, or alternatively, the service platform may use a naive Bayesian classifier technique. In this case, the service platform may perform binary recursive partitioning to split the data of the minimum feature set into partitions and/or branches and use the partitions and/or branches to perform predictions (e.g., that a topic will or will not be beneficial to the entity, that the service representative will or will not provide a threshold quality of service, and/or the like). Based on using recursive partitioning, the service platform may reduce utilization of computing resources relative to linear sorting and analysis of data points, thereby enabling use of thousands, millions, or billions of data points to train a model, which may result in a more accurate model than using fewer data points.

Additionally, or alternatively, the service platform may use a support vector machine (SVM) classifier technique to generate a non-linear boundary between data points in the training set. In this case, the non-linear boundary is used to classify test data (e.g., data relating a topic into a particular class (e.g., a class indicating that the topic is beneficial to the entity, a class indicating that the topic is not beneficial to the entity, that the service representative provided quality customer service, and/or the like).

Additionally, or alternatively, the service platform may train the entity analysis model using a supervised training procedure that includes receiving input to the model from a subject matter expert, which may reduce an amount of time, an amount of processing resources, and/or the like to train the entity analysis model relative to an unsupervised training procedure. In some implementations, the service platform may use one or more other model training techniques, such as a neural network technique, a latent semantic indexing technique, and/or the like. For example, the service platform may perform an artificial neural network processing technique (e.g., using a two-layer feedforward neural network architecture, a three-layer feedforward neural network architecture, and/or the like) to perform pattern recognition with regard to patterns of whether sentiment of the topic described using different semantic descriptions can indicate whether the topic provides a benefit to the entity, can indicate whether the service representative provided quality of service, and/or the like. In this case, using the artificial neural network processing technique may improve an accuracy of a model (e.g., the entity analysis model) generated by the service platform by being more robust to noisy, imprecise, or incomplete data.

In some implementations, the service platform may determine a sentiment associated with the topic, as described herein. For example, using the natural language processing of the user input and/or identified characteristics of the topic, the service platform may determine whether the topic is or can be associated with a particular sentiment of the user. As an example, from a sentiment analysis of one or more user inputs of the communication (e.g., from the user and/or the service representative), the service platform may determine that a topic is associated with positive sentiment, neutral sentiment, or negative sentiment. Additionally, or alternatively, the service platform may determine whether the user is happy, sad, angry, optimistic, pessimistic, appreciative, disgusted, and/or the like. In some implementations, the sentiment analysis may determine whether the user's sentiment is relative to the topic and/or the service representative. For example, while a user may be pleased with the service representative, the user may be displeased with a topic (e.g., the fact that the user needs to pay a transaction fee). Accordingly, the service platform may be configured to determine a plurality of sentiments associated with the user, the communication, and/or the service representative via one or more user inputs of the communication.

In some implementations, the service platform may determine a set of sentiment scores associated with a set of items associated with a communication (e.g., a topic of the communication, a communication interface of the communication, a service representative involved in the communication, an entity associated with the service platform, and/or the like). In some implementations, a sentiment score may be indicative of a sentiment of the user towards an item. For example, a greater sentiment score may be indicative of a user that has a more positive opinion towards an item, a user that is more inclined to be associated with (e.g., continue a relation with) an item, and/or the like. On the other hand, a lower sentiment score may be indicative of a user that has a more negative opinion towards an item, that is less inclined to be associated with an item, and/or the like. Accordingly, based on determining a sentiment associated with a topic, the service platform may determine a level of satisfaction that a user may have with the topic. As a more specific example, if the service platform determines that the topic of the communication is directed toward a transaction fee, the service platform may determine whether the user likes the transaction fee, dislikes the transaction fee, or is ambivalent toward the transaction fee using the sentiment analysis.

In some implementations, the service platform may receive, from a set of data sources, information that permits the service platform to determine the set of sentiment scores. For example, if the user opts to provide such information and/or authorize such information to be obtained, the information may include information associated with the user, such as information associated with a profile of the user, demographic information of the user, social media activity of the user, a purchase history of the user, a browsing history of the user, a messaging history associated with the user, and/or the like.

In some implementations, the service platform may use a machine learning model, such as a sentiment analysis model, to determine a sentiment associated with an item of a communication. For example, the service platform may train the sentiment analysis model based on one or more parameters associated with identifying sentiment of a communication, such as the natural language of one or more user inputs of the communication, a volume level of the one or more user inputs, a tone of the one or more user inputs, and/or the like. The service platform may train the sentiment analysis model, according to the one or more parameters, using historical data associated with determining sentiment associated with the one or more items or and/or one or more other similar items. Using the historical data and the one or more parameters as inputs to the sentiment analysis model, the service platform may determine the sentiment of the communication to determine whether a transaction protocol associated with the item and/or a communication processing protocol associated with the item is to be updated. The sentiment analysis model may be included as an element of the entity analysis model and/or may be separate from the entity analysis model.

In some implementations, the service platform may determine a sentiment of the user relative to a likelihood that the user desires to remain or not remain a customer of the entity. For example, the service platform, via the sentiment analysis and/or natural language processing analysis may be configured to identify one or more key words or key phrases associated with the user indicating that the user might close an account registered with the entity, discontinue receiving a service provided by the entity, and/or the like. Accordingly, a sentiment score, as described herein, may be representative of a likelihood that the user desires to end a relationship with the entity. In some implementation described herein, the service platform may perform one or more actions based on the sentiment score indicating that the user has a desire to end a relationship with the entity. For example, if the service platform determines that the user has made such an indication, the service platform may discontinue or suspend a transaction associated with the user (e.g., remove the fee from the user's account), discontinue or suspend any other users that are involved in related transactions, forward the user to a customer service specialist (e.g., a service representative that is more highly rated than the current service representative involved in the communication, a manager, and/or the like), and/or the like. In this way, the service platform may be configured to perform one or more actions to retain the user as a customer of the entity.

In this way, the service platform may perform a natural language processing analysis and/or a sentiment analysis of the communication to determine whether a further analysis of the communication is to be performed (e.g., a cost analysis of the communication and/or a sentiment analysis based on the service representative). Further, as described herein, the service platform may use any number of artificial intelligence techniques, machine learning techniques, deep learning techniques, and/or the like to analyze user inputs of the communications, identify one or more topics associated with the communications, determine sentiment of topics relative to the user, and/or the like.

As further shown in FIG. 1, and by reference number 130, the service platform may determine a value associated with the topic. In some implementations, the service platform may determine the value based on calculating a score associated with the topic. For example, the score can be determined using one or more calculations involving one or more parameters that indicate the value of the topic. Such parameters may include a monetary value associated with the topic (e.g., the monetary value of a transaction fee, the monetary value associated with a service (e.g., to provide or receive the service), and/or the like), a quantity of events (e.g., transactions) involving the topic (e.g., a number of transaction fees that are paid during a particular time period, and/or the like), a quantity of users associated with the topic (e.g., a number of individuals that pay the transaction fee), and/or the like. Accordingly, the score may indicate the value associated with the topic.

In some implementations, the value associated with the topic comprises a gain value associated with the topic. The gain value may indicate an amount of revenue, profit, and/or a relative benefit that the topic affords to the entity. In some implementations, to calculate the gain value associated with the topic, the service platform may identify (e.g., from a data structure storing a record or log of events and/or transactions involving the topic) a number of users that are associated with the topic (e.g., a number of users that pay a transaction fee, a number of users that receive a service, and/or the like) and determine the gain value based on the number of users (and/or a number of events) that are associated with the topic and a transaction value of the topic. For example, the service platform may multiply a number of users by the transaction value of the topic to determine an amount of revenue provided per user for the topic. In this way, the service platform may determine a gain associated with the topic that provides a benefit to the entity.

In some implementations, the service platform may determine the value of the topic based on determining the sentiment associated with the communication. For example, if the service platform determines (e.g., using the entity analysis model) that the user is upset with a transaction fee, the service platform may perform an analysis of the value of the transaction fee to determine whether the entity should continue to charge the transaction fee to the user and/or other users (e.g., because charging the transaction fee and receiving complaints associated with the transaction fee may not provide an overall benefit to the entity when considering the need to receive and support communications involving the complaints). On the other hand, if the service platform determines that the user is satisfied with the topic (e.g., does not mind paying the transaction fee), the service platform may not determine the value associated with the topic (e.g., because the service platform can presume that the transaction fee provides an overall benefit to the entity, relative to the communication with the user).

In this way, from determining a score associated with the topic (e.g., a score that indicates a value associated with the topic), the service platform may determine the value associated with the topic so that the value associated with the topic can be compared with a value associated with enabling the communication (e.g., to determine whether the topic provides a net gain or a net loss relative to enabling the communication).

As further shown in FIG. 1, and by reference number 140, the service platform may determine a value associated with enabling the conversation. In some implementations, the service platform may determine the value based on calculating a score associated with the communication. For example, the score can be determined using one or more calculations involving one or more parameters that indicate a value associated with enabling the communication. Such parameters may include a cost associated with hardware to pay for, power, and/or support the communication (e.g., the service representative device, network devices to receive and/or route the communications, computing resources to support the service platform, and/or the like), a cost associated with the service representative (e.g., salary costs, and/or the like), timing associated with the communication, a number of communications involving the topic, a duration of the communications involving the topic, and/or the like.

Accordingly, the value associated with enabling the communication may correspond to a cost value associated with enabling the communication. For example, the cost value may be determined based on identifying a number of communications involving the topic (e.g., from a data structure that logs the number of communications associated with the topic, the sentiment associated with the topic, and/or the like), identifying the value associated with enabling the communication (e.g., based on costs associated with powering and/or supporting the hardware for the communication, human resources costs associated with the service representative, and/or the like), and calculating the cost value based on the value associated with enabling the communication and the number of the communications. For example, the service platform may determine an average cost to enable a communication involving the topic based on the duration of calls involving the communication, the number of calls involving the communication, and/or the like. As mentioned above, in some implementations, only communications that involve or are associated with a negative sentiment toward the topic may be considered in the analysis.

In this way, from determining a score associated with enabling the communication, the service platform may determine the value associated with enabling the communication, to permit the service platform to perform an action based on the value associated with the topic and the value associated with enabling the communication.

As further shown in FIG. 1, and by reference number 150, the service platform may perform an action based on the value associated with the topic and the value associated with enabling the conversation. For example, the service platform may compare a first score associated with the topic and a second score associated with enabling the communication. In such cases, the first score and the second score may be used to determine a service performance score associated with the topic. For example, the service performance score may indicate whether the topic provides a net gain or a net cost (e.g., based on the determined value associated with the topic and the determined value associated with enabling the communication). In other words, the service performance score may indicate whether a level of performance of the entity, relative to the service provided by the entity, is advantageous for the entity. In some implementations, the service platform may determine the service performance score based on a sentiment value associated with the topic satisfying a threshold sentiment value (e.g., a sentiment that indicates negative sentiment and/or a certain degree of negative sentiment).

In some implementations, the service platform may perform an action that involves updating a transaction protocol associated with the topic. For example, the service platform may suspend and/or discontinue a transaction associated with the topic if the service platform determines that the communication involving the topic includes negative sentiment and/or a degree of negative sentiment. More specifically, the service platform may prevent the entity from issuing any further corresponding transaction fees to the user or any other user associated with the entity, may cancel one or more transactions involving the transaction fee, and/or the like, to prevent the service platform from needing to be involved in further communications associated with the transaction fee (e.g., that may include further complaints associated with the transaction fee). In some implementations, the service platform may append an annotation or flag to an account of the user to indicate the sentiment of the user (e.g., the level of satisfaction of the user) with respect to the topic.

Additionally, or alternatively, the service platform may perform an action that involves updating a communication protocol associated with the communication. For example, based on the sentiment and/or the service performance score, the service platform may forward the communication to another service representative (e.g., an upper level service representative (e.g., a managing service representative), a higher rated service representative, and/or the like). In some implementations, the service platform may update the communication protocol when the service platform determines that the communication includes negative sentiment toward the topic, but the service performance score indicates that the topic provides a relative benefit to the entity (e.g., the cost of enabling communications involving the topic does not outweigh the gain associated with the topic).

In some implementations, the service platform may update a machine learning model (e.g., the entity analysis model, the sentiment analysis model, a natural language processing model, and/or the like) based on the value associated with the topic and/or the value associated with enabling the communication. For example, the service platform may update the machine learning model to train the machine learning model based on the sentiment of the communication, the topic of the communication, the user device involved in the communication, the service representative device involved in the communication, the service representative involved in the communication, and/or the like. Accordingly, the information associated with the communication may be stored or be used as historical information to train the machine learning model.

In some implementations, the service platform may perform one or more actions that involve providing information associated with the communication to one or more devices associated with the entity (e.g., a management device, a storage device, and/or the like). For example, the service platform may generate a log entry and/or a report that identifies the topic of the communication, the sentiment of the user, a service representative performance associated with the communication (e.g., based on how the sentiment changed during the communication), an identification of the user, an identification of the service representative, the type of communication, a value associated with the topic, a value associated with enabling the communication, whether the topic provides a net gain or a net cost based on a service performance score associated with the topic, and/or the like. In this way, the entity (or a representative of the entity) can receive information associated with the communication (e.g., to determine whether any action is to be done regarding the topic and/or enabling communications involving the topic).

In this way, the service platform may perform one or more actions associated with the topic and/or enabling the communication based on the value associated with the topic and/or the value associated with enabling the communication. Accordingly, the service platform can identify and/or perform one or more actions to determine that computing resources and/or network resources are to be conserved by preventing any future communications involving the topic (e.g., which may be a result of suspending and/or discontinuing transactions and/or services associated with the topic).

As indicated above, FIG. 1 is provided as one or more examples. Other examples may differ from what is described with regard to FIG. 1. In some implementations, one or more devices and/or processes described with respect to example implementation 100 may correspond to one or more devices and/or include one or more processes described herein.

Figure 2:
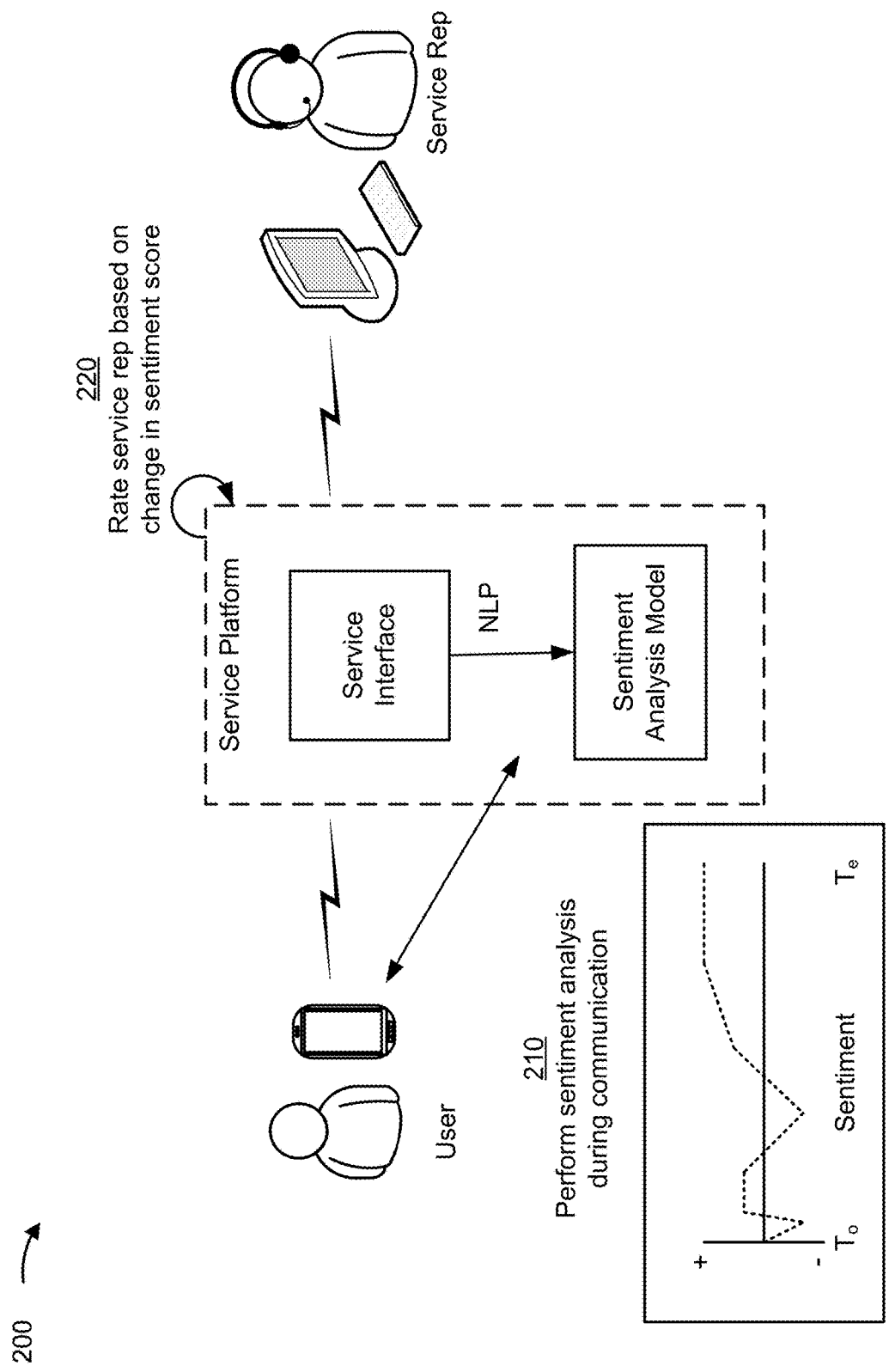

FIG. 2 is a diagram of an example implementation 200 described herein. Example implementation 200 includes a user device, a service representative device, and a service platform. The service platform of example implementation 200 includes a service interface and a sentiment analysis model that is configured to analyze (e.g., based on a natural language processing analysis) a sentiment of a communication between the user device and the service representative device. The communication may include a conversation between a user and a service representative (shown as "Service Rep"). In this way, as described herein, the service platform may perform one or more actions associated with the service representative and/or the communication based on the analyzed sentiment of the communication (e.g., a sentiment of the user with respect to a particular topic and/or the service representative). As described herein, the service representative device and/or the service platform may be associated with an entity, such as an entity that provides a service to the user of example implementation 200.

As shown in FIG. 2, and by reference number 210, the service platform may perform sentiment analysis during the communication. For example, the service platform may cause a sentiment analysis model, as described herein, to, in real-time, perform sentiment analysis associated with one or more items (e.g., a topic, the service representative, the entity, and/or the like) of the communication. As described herein, one or more scores associated with the sentiment may be based on the user's sentiment toward the item.

As shown in a graph of FIG. 2, the sentiment analysis model may track one or more scores during a duration of the communication (from time To to time Te) to determine a representative performance score. The representative performance score may be determined based on a change in one or more sentiment scores during the duration of the communication. For example, as shown by the graph, the sentiment score associated with the communication may start at a neutral position (based on the sentiment analysis model not knowing the sentiment of the user), move below neutral toward a negative sentiment score (e.g., the user indicates that the user is upset with a transaction fee), shift toward a positive sentiment score (e.g., the service representative indicates that they will do what they can to assist the user), shifts back toward a negative sentiment (e.g., the service representative indicates that the transaction fee is one of the policies of the entity), and ultimately shifts toward the positive (e.g., the service representative indicates the transaction fee will be removed, the service representative indicates that the transaction fee will not be applied in the future, the service representative ends the conversation with a well-received message, and/or the like). Accordingly, the graph may indicate an overall sentiment of the user during the communication.

From the overall sentiment of the user, the service platform can determine a service representative performance score, as described herein. In some implementations, the service representative performance score may be based on a change in the sentiment score over the course of the call, the sentiment score at the end of the communication, and/or the like. In some implementations, the service representative performance score may be based on a determined sentiment of the user with respect to the service representative. For example, the service representative performance score may be based specifically on whether the user had a positive or negative opinion of the service representative, as determined from a natural language processing analysis of the communication in combination with the sentiment analysis.

As further shown in FIG. 2, and by reference number 220, the service platform may rate the service representative based on the change in the sentiment score. For example, the service platform may rate the service representative relative to a plurality of service representatives associated with and/or employed by the entity. In some implementations, the service platform may maintain a log or record of service representative performance scores in a data structure for the plurality of service representatives. Accordingly, from the log or record of service representative performance scores, the service platform may generate a service representative rating associated with the service representative. In this way, the service platform can determine which service representatives excel and which service representatives struggle with respect to providing customer service to users. In some implementations, the log or record may be sorted and/or indexed according to topics, categories, and/or purposes, as described herein. Accordingly, the service platform may be configured to identify which service representatives, based on the service representative ratings for each topic, are relatively more capable or relatively less capable of satisfying a user during a communication.

In some implementations, the service platform may indicate and/or provide the service representative rating associated with the service representative. For example, the service platform may provide the service representative rating to a management device, a storage device, and/or the like to permit the entity to identify which service representatives excel and/or which service representatives struggle to provide satisfactory customer service during communications (e.g., relative to each other). In some implementations, the service representative rating is provided in combination with a score that indicates a value associated with a topic of a communication involving the service representative, and/or a score that indicates a value associated with enabling the communications involving the service representative. In such cases, the entity may use the service representative rating, the value associated with the topic, and the value associated with enabling the communications involving the service representative to determine whether the service representative is cost effective with respect to providing customer service with respect to the topic.

In this way, the service platform may perform a sentiment analysis of communications involving a particular service representative and determine whether the service representative (e.g., relative to other service representatives) is capable of handling communications involving a particular topic and/or satisfying a user. Accordingly, the service platform (and/or an associated entity) can determine whether a service representative may be better suited to handle communications involving a particular topic, and thus, more likely to enable the service platform to conserve computing resources and/or network resources associated with the communications.

As indicated above, FIG. 2 is provided as one or more examples. Other examples may differ from what is described with regard to FIG. 2. In some implementations, one or more devices and/or processes described with respect to example implementation 200 may correspond to one or more devices and/or include one or more processes described herein.

Figure 3A:
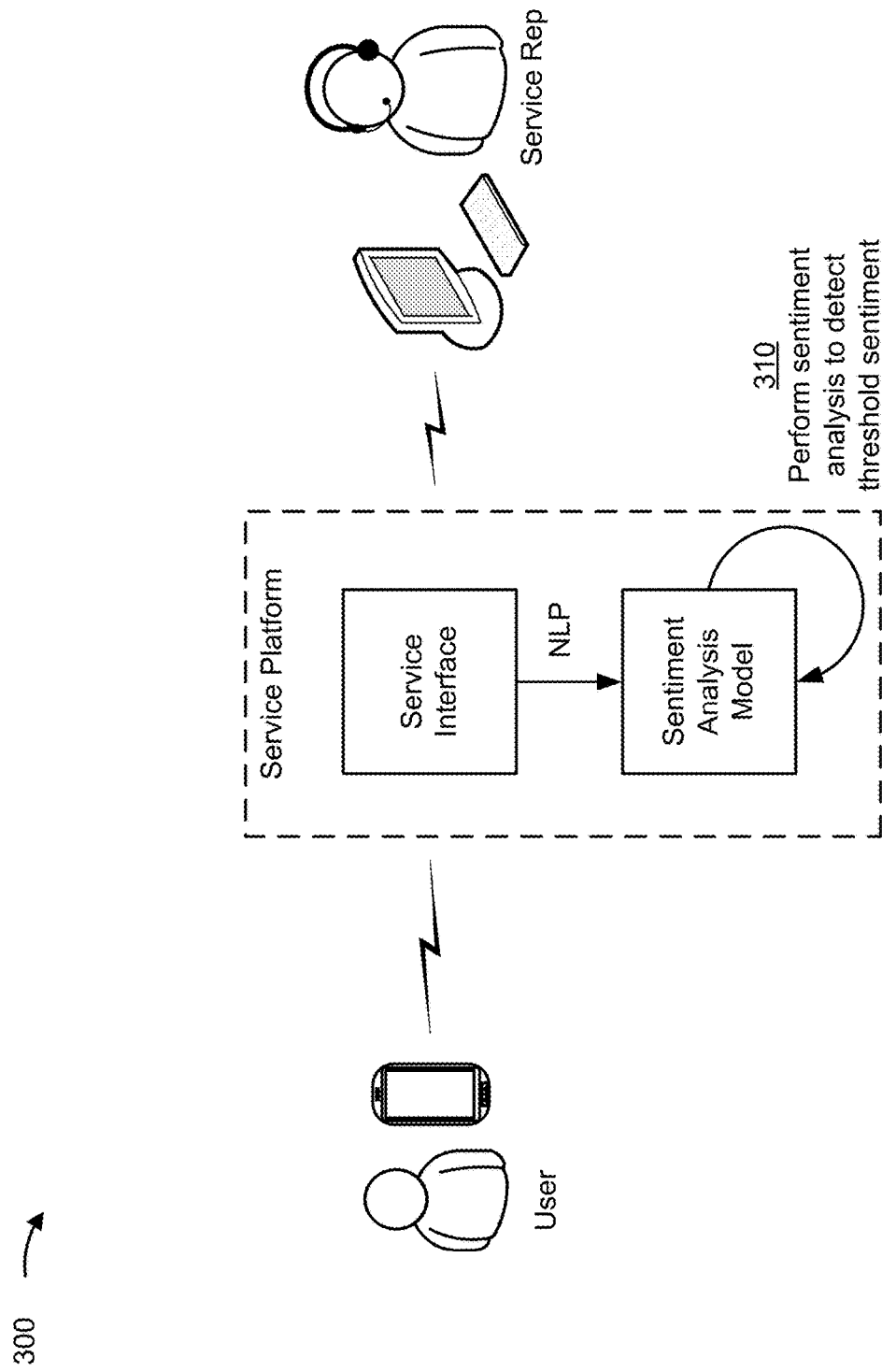
Figure 3B:
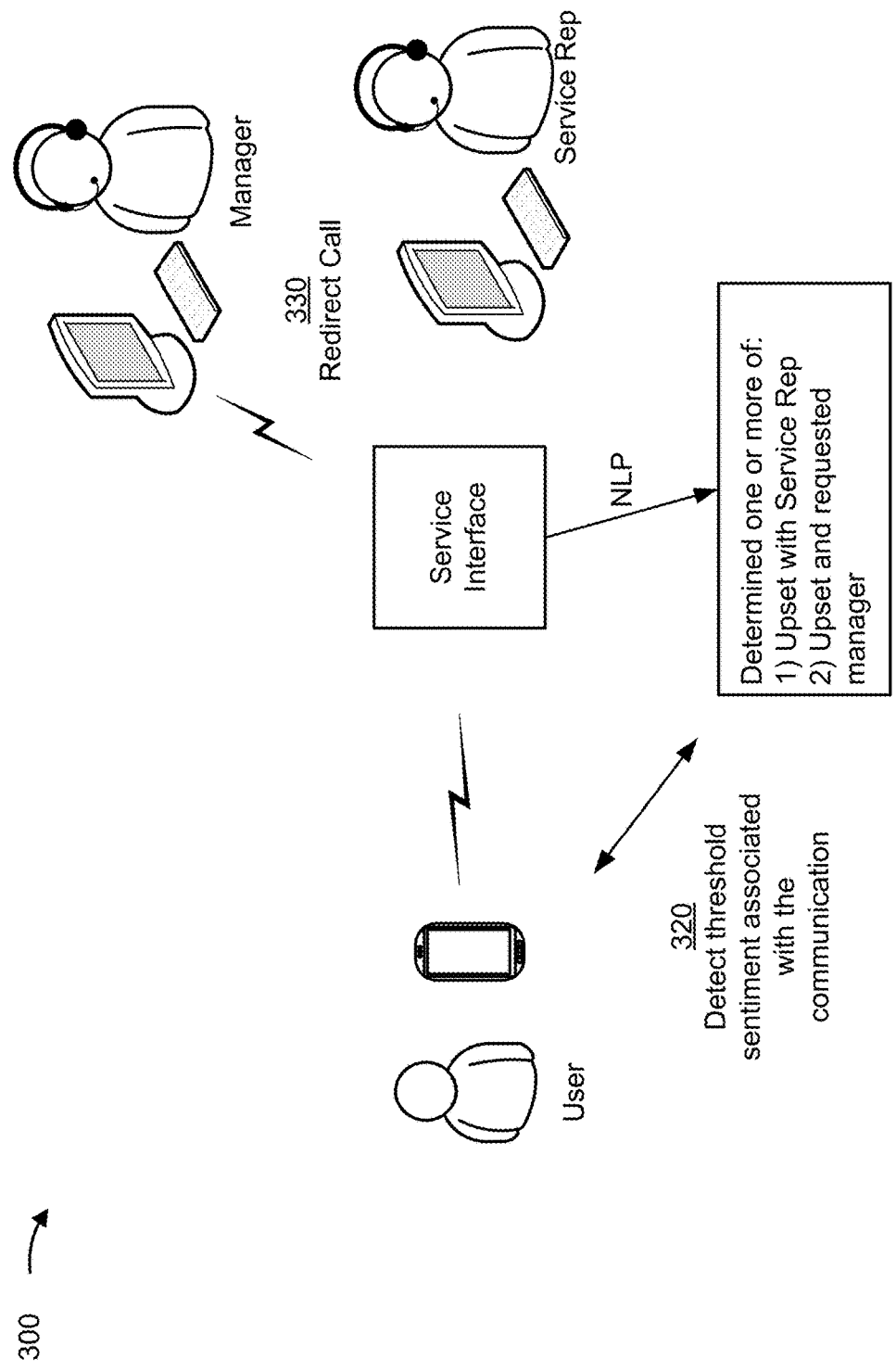

FIGS. 3A and 3B are diagrams of an example implementation 300 described herein. Example implementation 300 includes a user device, a service representative device of a service representative, a service representative device of a manager, and a service platform. The service platform of example implementation 300 includes a service interface and a sentiment analysis model that is configured to analyze a sentiment of a communication between the user device and the service representative device, which may include a conversation between a user and a service representative (shown as "Service Rep"). In this way, as described herein, the service platform may perform one or more actions associated with the service representative and/or the communication based on the analyzed sentiment of the communication (e.g., a sentiment of the user with respect to a particular topic and/or the service representative). As described herein, the service representative device and/or the service platform may be associated with an entity, such as an entity that provides a service to the user of example implementation 200.

As shown in FIG. 3A, and by reference number 310, the service platform may perform a sentiment analysis to detect a threshold sentiment. For example, the threshold sentiment may be a sentiment that indicates that the user has a negative sentiment and/or a certain degree of negative sentiment (e.g., according to the sentiment analysis performed by the sentiment analysis model). In some implementations, the sentiment may be based on one or more particular items. For example, the sentiment may be relative to the service representative, a topic of the communication, the entity, a communication interface of the communication, and/or the like.

As shown in FIG. 3B, and by reference number 320, the service platform detects a threshold sentiment associated with a topic of the communication. For example, the service platform may monitor a sentiment score, as described herein, compare the sentiment score to the threshold sentiment score, and determine, based on the comparison, that the sentiment score satisfies the threshold sentiment score. In some implementations, the sentiment score satisfying the threshold sentiment score may indicate that the user is upset with the service representative and/or that the user is upset and has requested a manager.

In this way, when the sentiment score satisfies the threshold sentiment score, the service platform may enable the communication to be redirected and/or may automatically redirect the communication to another service representative device (e.g., a service representative device of a manager).

As further shown in FIG. 3B, and by reference number 330, the service platform redirects the call to the service representative device of the manager. For example, the service platform may update a communication processing protocol associated with the communication to reroute the communication to the service representative device of the manager. Additionally, or alternatively, the service representative device may reroute the communication to a service representative device associated with a service representative that has a relatively higher service representative rating than the service representative of example implementation 300. In some implementations, a score associated with the communication involving the user may include a cost value associated with redirecting the call to the service representative device of the manager.

Accordingly, based on the sentiment score satisfying the threshold, the service platform may redirect the communication from the service representative device to another service representative device (e.g., a device of a manager) to establish the communication between the user device and the second service representative device.

In some implementations, the service platform may perform a preprocessing analysis of the user. For example, the service platform may analyze an account or profile of the user and determine that the user recently communicated with a particular service representative. In such cases, the service platform may automatically redirect the call to the particular service representative regardless of the sentiment of the communication (e.g., to permit a relationship to be developed and/or maintained between the user and the service representative). In some implementations, the service platform may only redirect the call to the previous service representative if the account or profile indicates that the user was satisfied with the service representative based on a service representative performance score from the previous communication.

In this way, the service platform may route communications involving a user based on a sentiment analysis performed during the communication and/or during previous communications involving the user. Accordingly, the service platform may identify which service representative is more likely to conserve computing resources and/or network resources associated with the communication by being relatively more suited to engage in the communication with the user (e.g., which service representative is more likely to resolve a dispute or complaint from the user). As described herein, the entity analysis model of the service platform may use machine learning to analyze characteristics of the user, characteristics of the service representative, and/or historical information associated with communications involving the user and/or the service representative to route communications between the user and a selected service representative for the communications.

As indicated above, FIGS. 3A and 3B are provided as one or more examples. Other examples may differ from what is described with regard to FIGS. 3A and 3B. In some implementations, one or more devices and/or processes described with respect to example implementation 300 may correspond to one or more devices and/or include one or more processes described herein.

In this way, the service platform, as described herein, may perform an analysis of a communication to identify a topic and update a transaction protocol involving the topic and/or a communication processing protocol associated with the communication. In this way, the service platform may determine whether resources of an entity are being wasted on a service and/or transaction that is not providing a benefit to the entity, relative to a gain value associated with the topic and a cost value associated with enabling communications involving the topic. In this way, the service platform provides a simplified, centralized system to identify topics of communications, determine whether the topics of the communications are associated with negative opinions of users that result in communications involving complaints, and eliminate such communications when the costs of enabling such communications exceed any benefit of offering services and/or engaging in transactions associated with the topics. Furthermore, if a topic is determined to provide a benefit despite a number of communications involving negative sentiment toward the topic, a sentiment analysis may determine which service representatives are best suited to handle such communications, to increase a likelihood that the communications are quickly and efficiently handled and/or processed and avoid lengthy communications that consume both computing resources and/or network resources. Accordingly, computing resources, network resources, and/or the like that are associated with identifying and/or handling such communications can be conserved using the service platform, as described herein.

Figure 4:
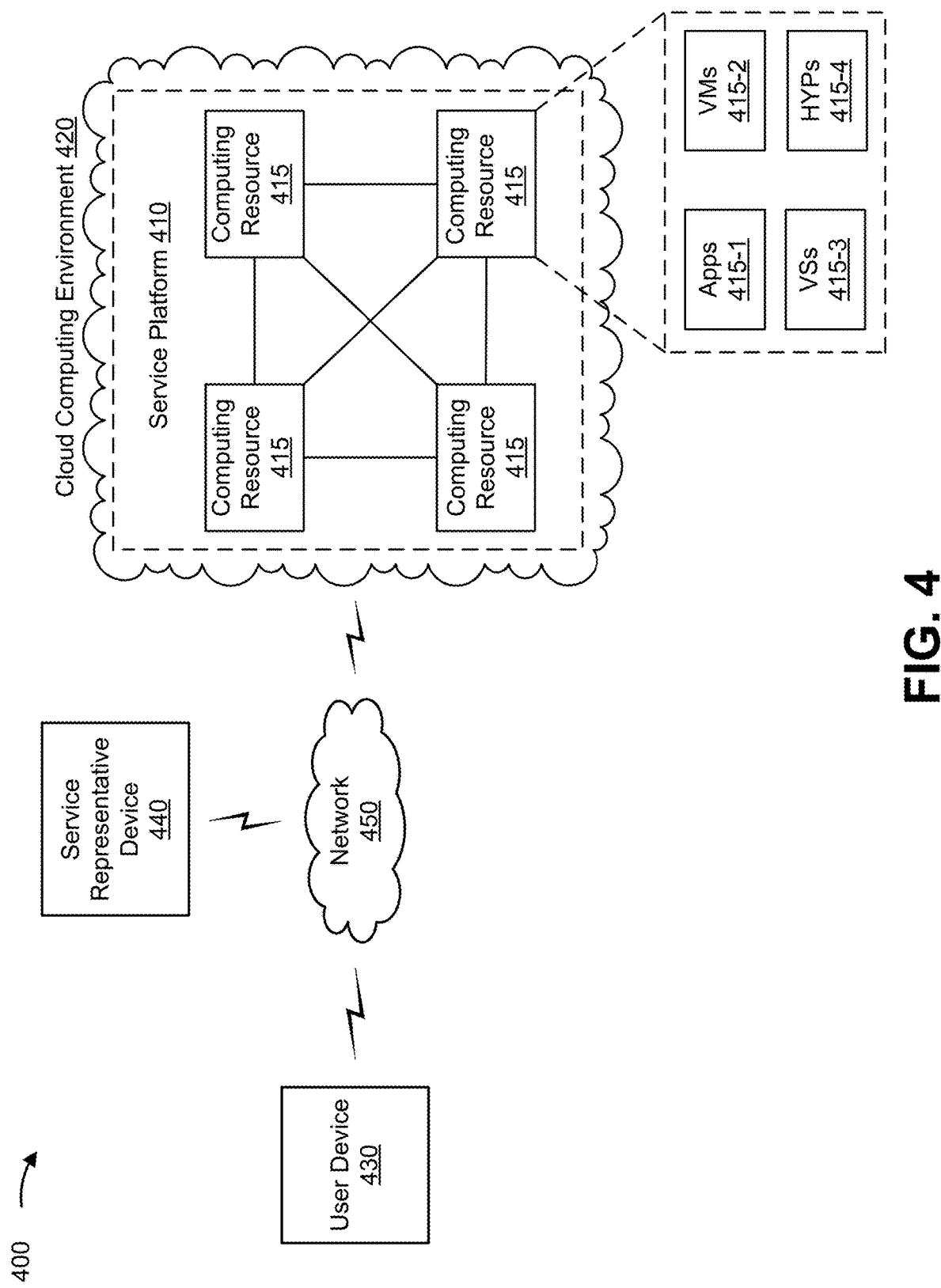
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a service platform 410, a computing resource 415, a cloud computing environment 420, a user device 430, a service representative device 440, and a network 450. Devices of environment 400 may interconnect via wired connections, wireless connections, or a combination of wired and wireless connections.

Service platform 410 includes one or more computing resources assigned to perform analysis of a topic in a communication relative to a characteristic of the communication. For example, service platform 410 may be a platform implemented by cloud computing environment 420 that may perform an analysis of a topic in a communication (e.g., a communication between user device 430 and service representative device 440) relative to a characteristic of the communication. In some implementations, service platform 410 is implemented by computing resources 415 of cloud computing environment 420.

Service platform 410 may include a service representative device or a group of service representative devices. In some implementations, service platform 410 may be hosted in cloud computing environment 420. Notably, while implementations described herein describe service platform 410 as being hosted in cloud computing environment 420, in some implementations, service platform 410 may be non-cloud-based or may be partially cloud-based.

Cloud computing environment 420 includes an environment that delivers computing as a service, whereby shared resources, services, etc., may be provided to user device 430, service representative device 440, and/or the like. Cloud computing environment 420 may provide computation, software, data access, storage, and/or other services that do not require end-user knowledge of a physical location and configuration of a system and/or a device that delivers the services. As shown, cloud computing environment 420 may include service platform 410 and computing resource 415.

Computing resource 415 includes one or more personal computers, workstation computers, service representative devices, or another type of computation and/or communication device. In some implementations, computing resource 415 may host service platform 410. The cloud resources may include compute instances executing in computing resource 415, storage devices provided in computing resource 415, data transfer devices provided by computing resource 415, etc. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by user device 430. Application 415-1 may eliminate a need to install and execute the software applications on user device 430. For example, application 415-1 may include software associated with service platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system ("OS"). A process virtual machine may execute a single program and may support a single process. In some implementations, virtual machine 415-2 may execute on behalf of a user (e.g., user device 430), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the guest operating systems and may manage the execution of the guest operating systems. Multiple instances of a variety of operating systems may share virtualized hardware resources.

User device 430 includes one or more devices capable of receiving, generating, storing, processing, and/or providing information associated with communication relative to a topic (e.g., a service, a transaction, and/or the like). For example, user device 430 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Service representative device 440 includes one or more devices capable of receiving, generating, storing, processing, and/or providing information associated with communication relative to a topic (e.g., a service, a transaction, and/or the like). For example, user device 430 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network 450 includes one or more wired and/or wireless networks. For example, network 450 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
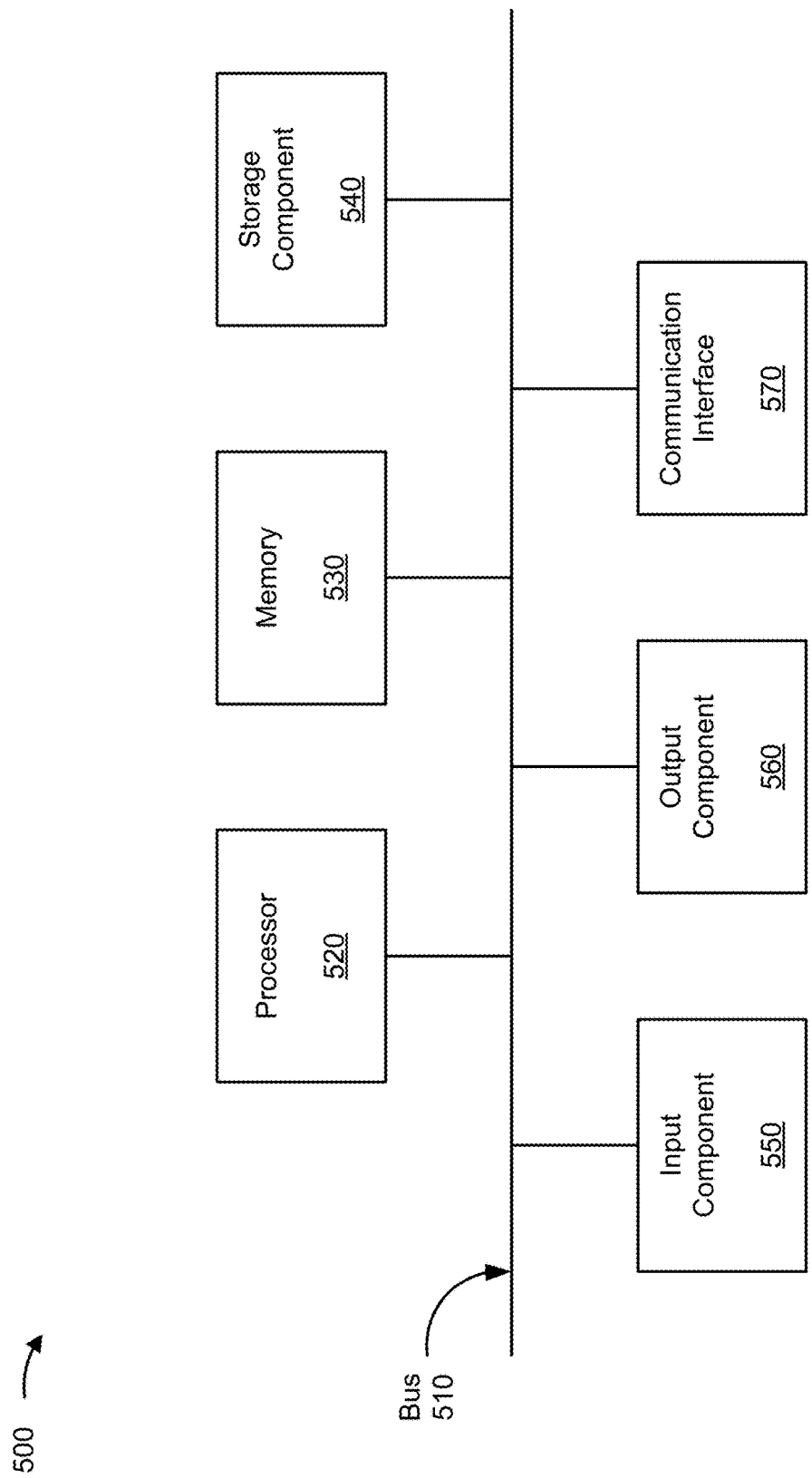
FIG. 5 is a diagram of example components of one or more devices of FIG. 4.

FIG. 5 is a diagram of example components of a device 500. Device 500 may correspond to service platform 410, computing resource 415, user device 430, and/or service representative device 440. In some implementations, service platform 410, computing resource 415, user device 430, and/or service representative device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
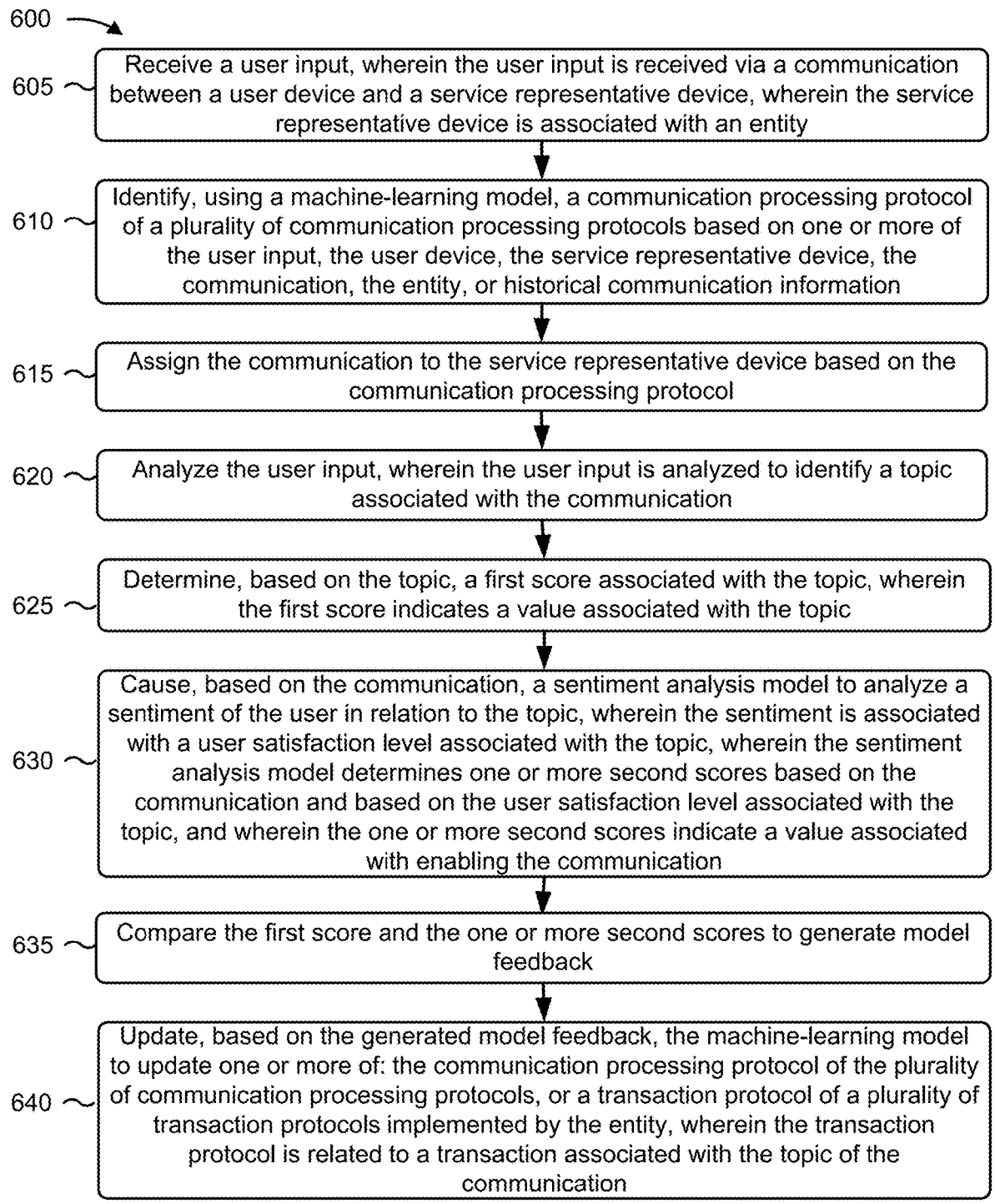

FIG. 6 is a flow chart of an example process 600 associated with an analysis of a topic in a communication relative to a characteristic of the communication. In some implementations, one or more process blocks of FIG. 6 may be performed by a service platform (e.g., service platform 410). In some implementations, one or more process blocks of FIG. 6 may be performed by another device or a group of devices separate from or including a service platform (e.g., service platform 410), such as a computing resource (e.g., computing resource 415), a user device (e.g., user device 430), and a service representative device (e.g., service representative device 440).

As shown in FIG. 6, process 600 may include receiving a user input, wherein the user input is received via a communication between a user device and a service representative device, and wherein the service representative device is associated with an entity (block 605). For example, the service platform (e.g., using computing resource 415, processor 520, memory 530, storage component 540, input component 550, communication interface 570, and/or the like) may receive a user input, as described above. In some implementations, the user input is received via a communication between a user device and a service representative device. In some implementations, the service representative device is associated with an entity.

As further shown in FIG. 6, process 600 may include identifying, using a machine learning model, a communication processing protocol of a plurality of communication processing protocols based on one or more of the user input, the user device, the service representative device, the communication, the entity, or historical communication information (block 610). For example, the service platform (e.g., using computing resource 415, processor 520, memory 530, storage component 540, input component 550, and communication interface 570, and/or the like) may identify, using a machine learning model, a communication processing protocol of a plurality of communication processing protocols based on one or more of the user input, the user device, the service representative device, the communication, the entity, or historical communication information, as described above.

As further shown in FIG. 6, process 600 may include assigning the communication to the service representative device based on the communication processing protocol (block 615). For example, the service platform (e.g., using a computing resource 415, a processor 520, a memory 530, a storage component 540, an output component 560, and a communication interface 570, and/or the like) may assign the communication to the service representative device based on the communication processing protocol, as described above.

As further shown in FIG. 6, process 600 may include analyzing the user input, wherein the user input is analyzed to identify a topic associated with the communication (block 620). For example, the service platform (e.g., using a computing resource 415, a processor 520, a memory 530, a storage component 540, an input component 550, and a communication interface 570, and/or the like) may analyze the user input, as described above. In some implementations, the user input is analyzed to identify a topic associated with the communication.

As further shown in FIG. 6, process 600 may include determining, based on the topic, a first score associated with the topic, wherein the first score indicates a value associated with the topic (block 625). For example, the service platform (e.g., using a computing resource 415, a processor 520, a memory 530, a storage component 540, an input component 550, and a communication interface 570, and/or the like) may determine, based on the topic, a first score associated with the topic, as described above. In some implementations, the first score indicates a value associated with the topic.

As further shown in FIG. 6, process 600 may include causing, based on the communication, a sentiment analysis model to analyze a sentiment of the user in relation to the topic, wherein the sentiment is associated with a user satisfaction level associated with the topic, wherein the sentiment analysis model determines one or more second scores based on the communication and based on the user satisfaction level associated with the topic, and wherein the one or more second scores indicate a value associated with enabling the communication (block 630). For example, the service platform (e.g., using a computing resource 415, a processor 520, a memory 530, a storage component 540, an output component 560, and a communication interface 570, and/or the like) may cause, based on the communication, a sentiment analysis model to analyze a sentiment of the user in relation to the topic, as described above. In some implementations, the sentiment is associated with a user satisfaction level associated with the topic. In some implementations, the sentiment analysis model determines one or more second scores based on the communication and based on the user satisfaction level associated with the topic. In some implementations, the one or more second scores indicate a value associated with enabling the communication.

As further shown in FIG. 6, process 600 may include comparing the first score and the one or more second scores to generate model feedback (block 635). For example, the service platform (e.g., using a computing resource 415, a processor 520, a memory 530, a storage component 540, an input component 550, and a communication interface 570, and/or the like) may compare the first score and the one or more second scores to generate model feedback, as described above.

As further shown in FIG. 6, process 600 may include updating, based on the generated model feedback, the machine learning model to update one or more of: the communication processing protocol of the plurality of communication processing protocols, or a transaction protocol of a plurality of transaction protocols implemented by the entity, wherein the transaction protocol is related to a transaction associated with the topic of the communication (block 640). For example, the service platform (e.g., using a computing resource 415, a processor 520, a memory 530, a storage component 540, an output component 560, and a communication interface 570, and/or the like) may update, based on the generated model feedback, the machine learning model to update one or more of: the communication processing protocol of the plurality of communication processing protocols, or a transaction protocol of a plurality of transaction protocols implemented by the entity, as described above. In some implementations, the transaction protocol is related to a transaction associated with the topic of the communication.

Process 600 may include additional implementations, such as any single implementation or any combination of implementations described below and/or in connection with one or more other processes described elsewhere herein.

In some implementations, the service platform may determine, from the first score and the one or more second scores, a performance score associated with the topic, and may send a notification to a device associated with the entity when the performance score satisfies a threshold performance score. In some implementations, the value associated with the topic may comprise a gain value associated with the topic, and the gain value may be determined based on identifying a number of users that are associated with the topic, and calculating the gain value based on the number of users that are associated with the topic and a transaction value of the topic.

In some implementations, the value associated with enabling the communication may comprise a cost value associated with enabling the communication, where the cost value is determined based on identifying a number of communications involving the topic, identifying the value associated with enabling the communication, and calculating the cost value based on the value associated with enabling the communication and the number of the communications.

In some implementations, the sentiment analysis model may be configured to track the one or more second scores during a duration of the communication to determine a representative performance score, where the representative performance score is determined based on a change in the one or more second scores during the duration of the communication, and the service platform may perform an action associated with the representative performance score.

In some implementations, when performing the action associated with the representative performance score, the service platform may generate, based on the representative performance score, a service representative rating associated with a service representative, where the service representative is associated with the service representative device, and may provide, to a device associated with the entity, the service representative rating associated with the service representative.

In some implementations, the service representative device may be a first service representative device, when performing the action associated with the representative performance score, the service platform may determine that the representative performance score satisfies a threshold, and, based on the representative performance score satisfying the threshold, may redirect the communication from the first service representative device to a second service representative device to establish the communication between the user device and the second service representative device. In some implementations, the service representative device may comprise an automated response system configured to receive feedback associated with the entity from the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 associated with an analysis of a topic in a communication relative to a characteristic of the communication. In some implementations, one or more process blocks of FIG. 7 may be performed by a service platform (e.g., service platform 410). In some implementations, one or more process blocks of FIG. 7 may be performed by another device or a group of devices separate from or a service platform (e.g., service platform 410), such as a computing resource (e.g., computing resource 415), a user device (e.g., user device 430), and a service representative device (e.g., service representative device 440).

As shown in FIG. 7, process 700 may include receiving a user input from a user, wherein the user input is included in a communication between a user device associated with the user and a service representative device associated with a service representative of an entity (block 710). For example, the service platform (e.g., using a computing resource 415, a processor 520, a memory 530, a storage component 540, an input component 550, and a communication interface 570, and/or the like) may receive a user input from a user, as described above. In some implementations, the user input is included in a communication between a user device associated with the user and a service representative device associated with a service representative of an entity.

As further shown in FIG. 7, process 700 may include performing a natural language processing analysis of the user input, wherein the natural language processing analysis is configured to identify one or more specific topics (block 720). For example, the service platform (e.g., using a computing resource 415, a processor 520, a memory 530, a storage component 540, an output component 560, and a communication interface 570, and/or the like) may perform a natural language processing analysis of the user input, as described above. In some implementations, the natural language processing analysis is configured to identify one or more specific topics.

As shown in FIG. 7, process 700 may include identifying, from the natural language processing analysis of the user input, a topic associated with the communication, wherein the topic is one of the one or more specific topics (block 730). For example, the service platform (e.g., using a computing resource 415, a processor 520, a memory 530, a storage component 540, an input component 550, and a communication interface 570, and/or the like) may identify, from the natural language processing analysis of the user input, a topic associated with the communication, as described above. In some implementations, the topic is one of the one or more specific topics.

As shown in FIG. 7, process 700 may include determining a first score associated with the topic, wherein the first score indicates a value associated with the topic (block 740). For example, the service platform (e.g., using a computing resource 415, a processor 520, a memory 530, a storage component 540, an input component 550, and a communication interface 570, and/or the like) may determine a first score associated with the topic, as described above. In some implementations, the first score indicates a value associated with the topic.

As shown in FIG. 7, process 700 may include performing, based on the natural language processing analysis, a sentiment analysis of the communication (block 750). For example, the service platform (e.g., using a computing resource 415, a processor 520, a memory 530, a storage component 540, an output component 560, and a communication interface 570, and/or the like) may perform, based on the natural language processing analysis, a sentiment analysis of the communication, as described above.

As shown in FIG. 7, process 700 may include determining, based on the sentiment analysis, a sentiment score associated with the topic, wherein the sentiment score indicates a level of satisfaction of the user with respect to the topic (block 760). For example, the service platform (e.g., using a computing resource 415, a processor 520, a memory 530, a storage component 540, an input component 550, and a communication interface 570, and/or the like) may determine, based on the sentiment analysis, a sentiment score associated with the topic, as described above. In some implementations, the sentiment score indicates a level of satisfaction of the user with respect to the topic.

As shown in FIG. 7, process 700 may include determining a second score associated with the communication, wherein the second score indicates a value associated with enabling the communication (block 770). For example, the service platform (e.g., using a computing resource 415, a processor 520, a memory 530, a storage component 540, an input component 550, and a communication interface 570, and/or the like) may determine a second score associated with the communication, as described above. In some implementations, the second score indicates a value associated with enabling the communication.

As shown in FIG. 7, process 700 may include updating a machine learning model to update one or more of the following: a communication processing protocol associated with the communication, or a transaction protocol implemented by the entity, wherein the transaction protocol is related to a transaction associated with the topic of the communication (block 780). For example, the service platform (e.g., using a computing resource 415, a processor 520, a memory 530, a storage component 540, an output component 560, and a communication interface 570, and/or the like) may update a machine learning model to update one or more of the following: a communication processing protocol associated with the communication, or a transaction protocol implemented by the entity, as described above. In some implementations, the transaction protocol is related to a transaction associated with the topic of the communication.

Process 700 may include additional implementations, such as any single implementation or any combination of implementations described below and/or in connection with one or more other processes described elsewhere herein.

In some implementations, the topic may be associated with a service provided by the entity, where the value associated with the topic is a gain value associated with the service, where the value associated with enabling the communication is a cost value of the entity, and where updating the machine learning model causes the machine learning model to at least one of: update the communication processing protocol to send a notification to alert the entity that the cost value associated with enabling the communication exceeds the gain value associated with the service, or update the transaction protocol to suspend the transaction.

In some implementations, the service representative device may be a first service representative device, the service platform may determine that the sentiment score satisfies a threshold, and may, based on the sentiment score satisfying the threshold, redirect the communication from the first service representative device to a second service representative device, to establish a communication between the user device and the second service representative device, where the second score is determined based on establishing the communication between the user device and the second service representative device.

In some implementations, the natural language processing analysis may be configured according to the machine learning model, where the machine learning model is trained to identify the one or more specific topics based on historical information associated with identifying the one or more specific topics and parameters associated with the one or more specific topics. In some implementations, the topic may be associated with a service provided by the entity, and the service platform, when updating the machine learning model, may determine a service performance score based on the first score and the second score, and may cause the machine learning model to update the transaction protocol to suspend or discontinue the service based on the service performance score.

In some implementations, sentiment analysis may track the sentiment score during a duration of the communication to determine a representative performance score, and the service platform may determine the representative performance score based on a change in the sentiment score during the duration of the communication, may generate a service representative rating for the service representative based on the representative performance score, and may provide, to a device associated with the entity, the service representative rating, the first score, and the second score.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
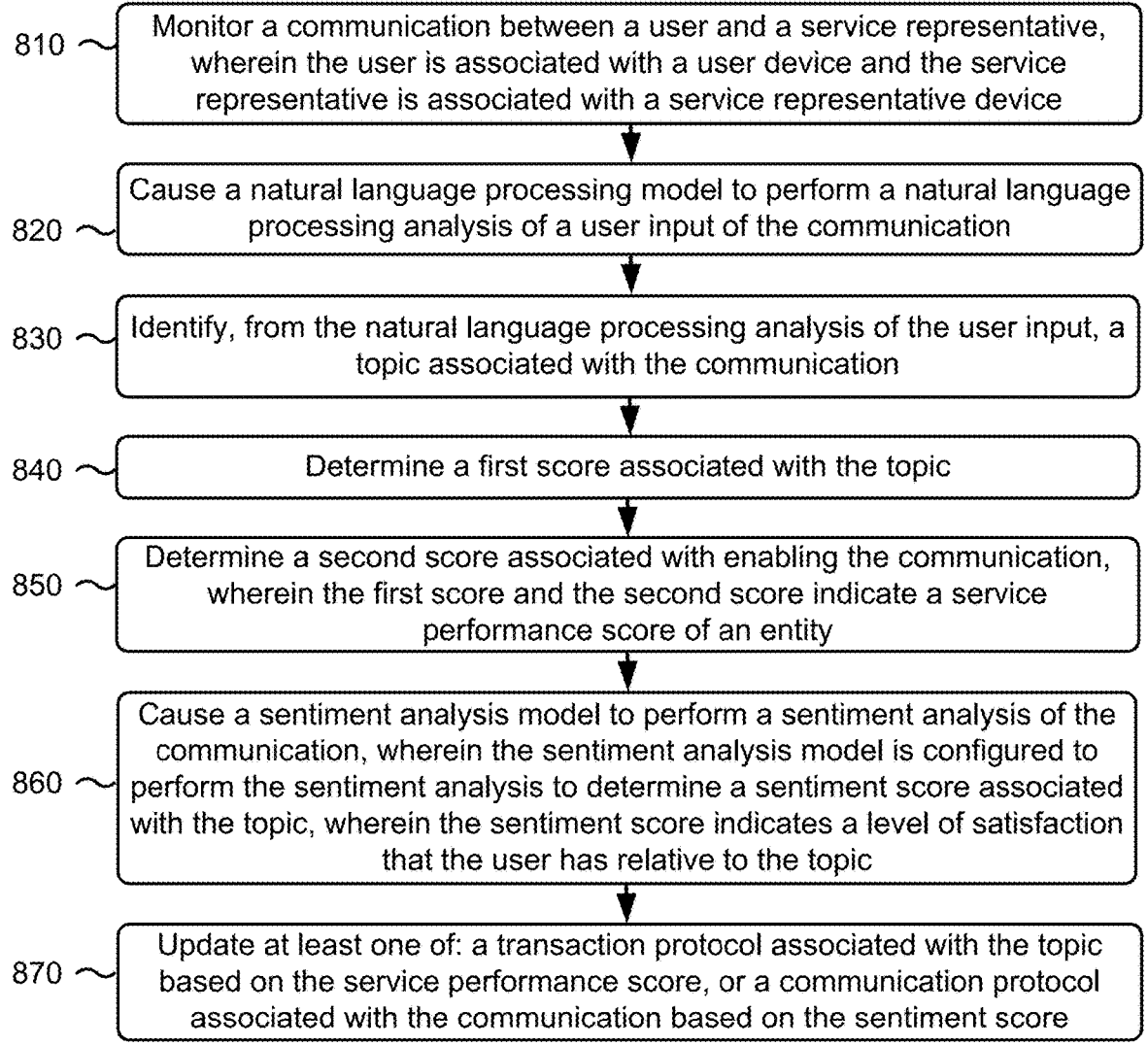

FIG. 8 is a flow chart of an example process 800 associated with an analysis of a topic in a communication relative to a characteristic of the communication. In some implementations, one or more process blocks of FIG. 8 may be performed by a service platform (e.g., service platform 410). In some implementations, one or more process blocks of FIG. 8 may be performed by another device or a group of devices separate from or including a service platform (e.g., service platform 410), such as a computing resource (e.g., computing resource 415), a user device (e.g., user device 430), and a service representative device (e.g., service representative device 440).

As shown in FIG. 8, process 800 may include monitoring a communication between a user and a service representative, wherein the user is associated with a user device and the service representative is associated with a service representative device (block 810). For example, the service platform (e.g., using a computing resource 415, a processor 520, a memory 530, a storage component 540, an input component 550, and a communication interface 570, and/or the like) may monitor a communication between a user and a service representative, as described above. In some implementations, the user is associated with a user device and the service representative is associated with a service representative device.

As further shown in FIG. 8, process 800 may include causing a natural language processing model to perform a natural language processing analysis of a user input of the communication (block 820). For example, the service platform (e.g., using a computing resource 415, a processor 520, a memory 530, a storage component 540, an output component 560, and a communication interface 570, and/or the like) may cause a natural language processing model to perform a natural language processing analysis of a user input of the communication, as described above.

As further shown in FIG. 8, process 800 may include identifying, from the natural language processing analysis of the user input, a topic associated with the communication (block 830). For example, the service platform (e.g., using a computing resource 415, a processor 520, a memory 530, a storage component 540, an input component 550, and a communication interface 570, and/or the like) may identify, from the natural language processing analysis of the user input, a topic associated with the communication, as described above.

As further shown in FIG. 8, process 800 may include determining a first score associated with the topic (block 840). For example, the service platform (e.g., using a computing resource 415, a processor 520, a memory 530, a storage component 540, an input component 550, and a communication interface 570, and/or the like) may determine a first score associated with the topic, as described above.

As further shown in FIG. 8, process 800 may include determining a second score associated with enabling the communication, wherein the first score and the second score indicate a service performance score of an entity (block 850). For example, the service platform (e.g., using a computing resource 415, a processor 520, a memory 530, a storage component 540, an input component 550, and a communication interface 570, and/or the like) may determine a second score associated with enabling the communication, as described above. In some implementations, the first score and the second score indicate a service performance score of an entity.

As further shown in FIG. 8, process 800 may include causing a sentiment analysis model to perform a sentiment analysis of the communication, wherein the sentiment analysis model is configured to perform the sentiment analysis to determine a sentiment score associated with the topic, wherein the sentiment score indicates a level of satisfaction that the user has relative to the topic (block 860). For example, the service platform (e.g., using a computing resource 415, a processor 520, a memory 530, a storage component 540, an output component 560, and a communication interface 570, and/or the like) may cause a sentiment analysis model to perform a sentiment analysis of the communication, as described above. In some implementations, the sentiment analysis model is configured to perform the sentiment analysis to determine a sentiment score associated with the topic. In some implementations, the sentiment score indicates a level of satisfaction that the user has relative to the topic.

As further shown in FIG. 8, process 800 may include updating at least one of: a transaction protocol associated with the topic based on the service performance score, or a communication processing protocol associated with the communication based on the sentiment score (block 870). For example, the service platform (e.g., using a computing resource 415, a processor 520, a memory 530, a storage component 540, an output component 560, and a communication interface 570, and/or the like) may update at least one of: a transaction protocol associated with the topic based on the service performance score, or a communication processing protocol associated with the communication based on the sentiment score, as described above.

Process 800 may include additional implementations, such as any single implementation or any combination of implementations described below and/or in connection with one or more other processes described elsewhere herein.

In some implementations, the service platform may, before monitoring the communication, perform a preprocessing analysis of the user, may determine, based on the preprocessing analysis, that the user was previously engaged in a prior communication with a device associated with the service representative, and may establish the communication between the user and the service representative based on the user device. In some implementations, when updating the transaction protocol, the service platform may determine that the sentiment score satisfies a threshold sentiment score, and may provide, based on the sentiment score satisfying the threshold sentiment score, the service performance score to a management device associated with the entity.

In some implementations, the topic may be associated with a service provided by the entity and, when updating the transaction protocol, the service platform may determine that the sentiment score satisfies a threshold sentiment score, may determine, based on the sentiment score satisfying the threshold sentiment score, whether the service performance score satisfies a threshold service performance score and, when the service performance score satisfies the threshold service performance score, may cause a transaction associated with the service to be suspended or discontinued.

In some implementations, the topic may be associated with a service provided by the entity, and the service performance score may indicate whether a level of performance of the entity, relative to the service provided by the entity, is advantageous for the entity. In some implementations, the topic may be associated with a service provided by the entity and, when updating the transaction protocol, the service platform may append, based on the sentiment score, an annotation to an account of the user, where the annotation indicates the level of satisfaction of the user, and where the account of the user is associated with the service.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data associated with a communication between a user device associated with a user and a first service representative device associated with a first service representative of an entity;
   analyzing, by the device, the data associated with the communication to determine one or more topics associated with the communication;
   tracking, by the device, during the communication, and using a sentiment analysis model, a level of satisfaction of the user with respect to the communication;
   determining, by the device and based on tracking the level of satisfaction of the user, a first representative rating for the first service representative,
      the first representative rating being based on a change a measure of user sentiment during the communication;
   analyzing, by the device, during the communication, and using a machine learning model, the one or more topics and the level of satisfaction of the user to determine a second service representative to which the communication is to be redirected,
the second service representative being associated with a second representative rating that is higher than the first representative rating; and
redirecting, by the device, the communication from the first service representative device to a second service representative device associated with the second service representative.

2. The method of claim 1, wherein the communication comprises at least one of:
a voice call, or
a text-based communication.

3. The method of claim 1, wherein analyzing the data associated with the communication comprises:
analyzing the data associated with the communication using one or more natural language processing techniques.

4. The method of claim 1, wherein tracking the level of satisfaction of the user comprises:
periodically obtaining, during the communication and using the sentiment analysis model, a sentiment score indicating the level of satisfaction of the user.

5. The method of claim 4, further comprising:
determining that the sentiment score meets a threshold score; and
wherein redirecting the communication comprises:
redirecting the communication based on determining that the sentiment score meets the threshold score.

6. The method of claim 1, further comprising:
obtaining, based on the one or more topics, the service representative rating for the second service representative; and
wherein determining the second service representative comprises:
determining the second service representative based on the service representative rating.

7. The method of claim 6, wherein obtaining the service representative rating comprises:
obtaining the service representative rating based on a plurality of historical representative performance scores associated with a respective plurality of historical communications involving the second service representative.

8. A device, comprising:
one or more memories; and
one or more processors communicatively coupled to the one or more memories, configured to:
receive data associated with a communication between a user device associated with a user and a first service representative device associated with a first service representative of an entity;
analyze the data associated with the communication to determine one or more topics associated with the communication;
track during the communication, and using a sentiment analysis model, a level of satisfaction of the user with respect to the communication;
determine, based on tracking the level of satisfaction of the user, a first representative rating for the first service representative,
the first representative rating being based on a change a measure of user sentiment during the communication;
analyze during the communication, and using a machine learning model, the one or more topics and the level of satisfaction of the user to determine a second service representative to which the communication is to be redirected,
the second service representative being associated with a second representative rating that is higher than the first representative rating; and
redirect the communication from the first service representative device to a second service representative device associated with the second service representative.

9. The device of claim 8, wherein the communication comprises at least one of:
a voice call, or
a text-based communication.

10. The device of claim 8, wherein the one or more processors, when analyzing the data associated with the communication, are configured to:
analyze the data associated with the communication using one or more natural language processing techniques.

11. The device of claim 8, wherein the one or more processors, when tracking the level of satisfaction of the user, are configured to:
periodically obtain, during the communication and using the sentiment analysis model, a sentiment score indicating the level of satisfaction of the user.

12. The device of claim 11, wherein the one or more processors are further configured to:
determine that the sentiment score meets a threshold score; and
wherein the one or more processors, when redirecting the communication, are configured to:
redirect the communication based on determining that the sentiment score meets the threshold score.

13. The device of claim 8, wherein the one or more processors are further configured to:
obtain, based on the one or more topics, the service representative rating for the second service representative; and
wherein the one or more processors, when determining the second service representative, are configured to:
determine the second service representative based on the service representative rating.

14. The device of claim 13, wherein the one or more processors, when obtaining the service representative rating, are configured to:
obtain the service representative rating based on a plurality of historical representative performance scores associated with a respective plurality of historical communications involving the second service representative.

15. A non-transitory computer-readable medium storing instructions, the instructions comprising:
one or more instructions that, when executed by one or more processors, cause the one or more processors to:
receive data associated with a communication between a user device associated with a user and a first service representative device associated with a first service representative of an entity;
analyze the data associated with the communication to determine one or more topics associated with the communication;
track during the communication, and using a sentiment analysis model, a level of satisfaction of the user with respect to the communication;
determine, based on tracking the level of satisfaction of the user, a first representative rating for the first service representative, the first representative rating being based on a change a measure of user sentiment during the communication;

analyze during the communication, and using a machine learning model, the one or more topics and the level of satisfaction of the user to determine a second service representative to which the communication is to be redirected, the second service representative being associated with a second representative rating that is higher than the first representative rating; and redirect the communication from the first service representative device to a second service representative device associated with the second service representative.

16. The non-transitory computer-readable medium of claim 15, wherein the communication comprises at least one of:

a voice call, or a text-based communication.

17. The non-transitory computer-readable medium of claim 15, wherein the one or more instructions, that cause the one or more processors to analyze the data associated with the communication, cause the one or more processors to:

analyze the data associated with the communication using one or more natural language processing techniques.

18. The non-transitory computer-readable medium of claim 15, wherein the one or more instructions, that cause the one or more processors to track the level of satisfaction of the user, cause the one or more processors to:

periodically obtain, during the communication and using the sentiment analysis model, a sentiment score indicating the level of satisfaction of the user.

19. The non-transitory computer-readable medium of claim 18, wherein the one or more instructions, when executed by the one or more processors, further cause the one or more processors to:

determine that the sentiment score meets a threshold score; and wherein the one or more instructions, that cause the one or more processors to redirect the communication, cause the one or more processors to:

redirect the communication based on determining that the sentiment score meets the threshold score.

20. The non-transitory computer-readable medium of claim 15, wherein the one or more instructions, when executed by the one or more processors, further cause the one or more processors to:

obtain, based on the one or more topics, the service representative rating for the second service representative; and wherein the one or more instructions, that cause the one or more processors to determine the second service representative, cause the one or more processors to:

determine the second service representative based on the service representative rating.

* * * * *